Dec. 5, 1939.　　　D. H. CAMERON　　　2,181,866
HYDROGEN ION METER
Filed May 26, 1937　　　2 Sheets-Sheet 1
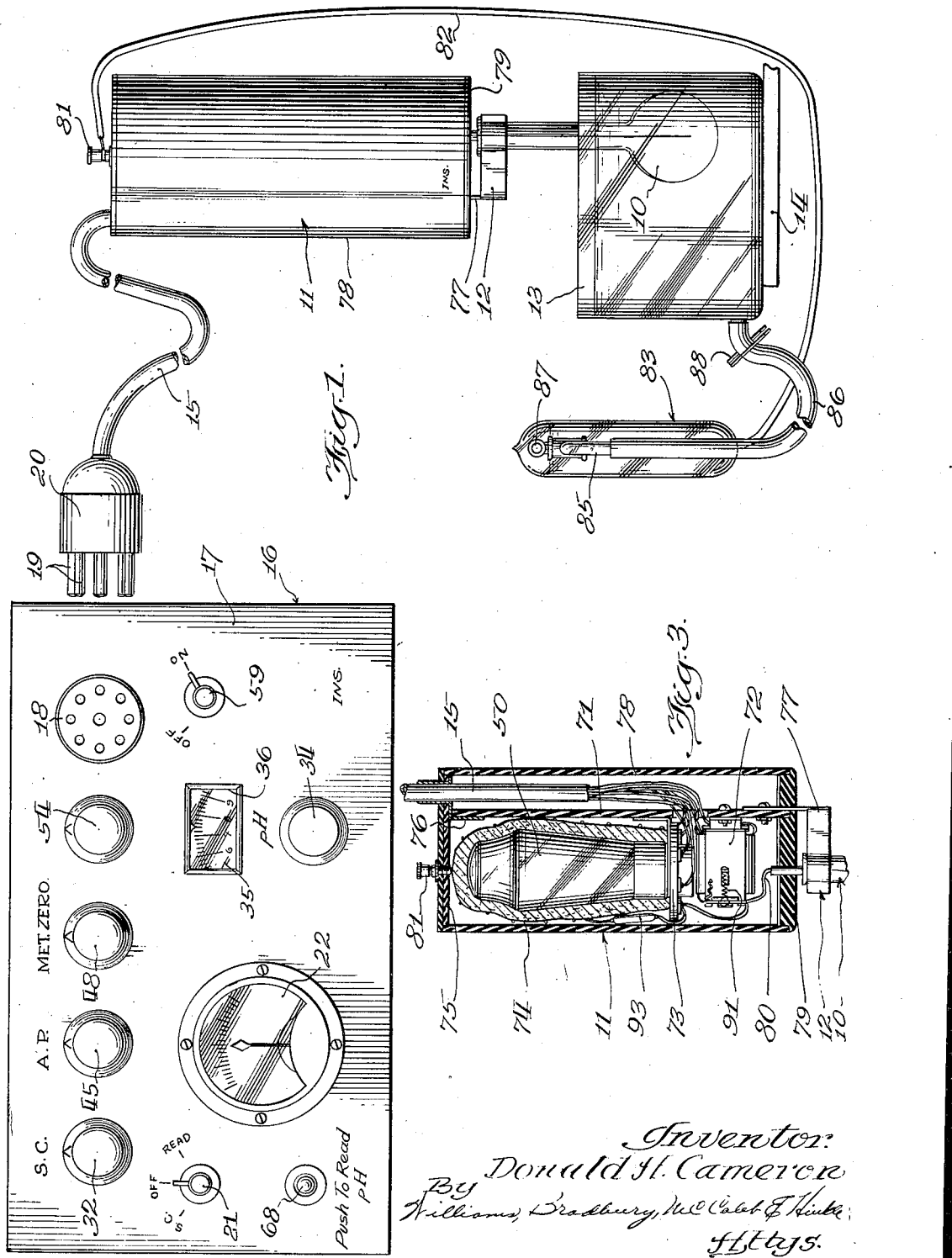

Dec. 5, 1939.  D. H. CAMERON  2,181,866
HYDROGEN ION METER
Filed May 26, 1937   2 Sheets-Sheet 2
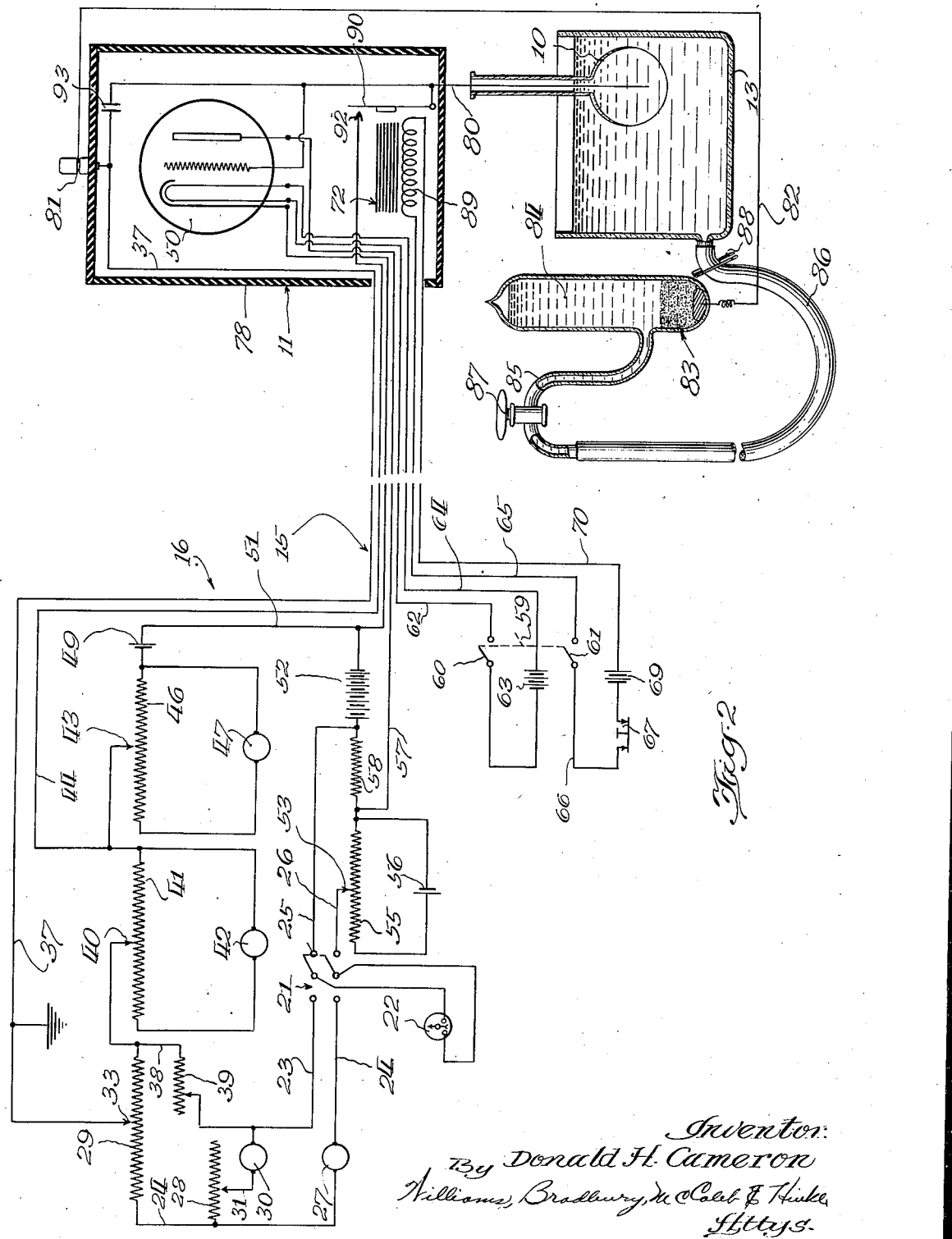
Inventor:
Donald H. Cameron
By Williams, Bradbury, McCaleb & Hinkle
Attys.

Patented Dec. 5, 1939

2,181,866

UNITED STATES PATENT OFFICE 2,181,866

HYDROGEN ION METER

Donald H. Cameron, Racine, Wis., assignor to B. D. Eisendrath Tanning Co., Chicago, Ill., a corporation of Illinois Application May 26, 1937, Serial No. 144,873

15 Claims. (Cl. 175—183)

The invention relates to hydrogen ion meters and has for its principal object to provide a simple, effective and accurate meter which can easily be put into operation for the attainment of consistent measurements.

The improved meter comprises two principal units which may be located at suitable distances apart. One of these units, which may be referred to as the remote unit, includes a glass electrode of known type which is brought into cooperation with a sample of the liquid to be tested, being immersed therein. This unit is connected to the central unit by means of a cable which includes numerous conductors. The central or main unit comprises potentiometers and other electrical devices which cooperate in the determination of the measurement.

The invention will fully be understood from the following description of a preferred embodiment thereof, taken in conjunction with the accompanying drawings, in which:

Figure 1 is an elevational view showing the two units which constitute the apparatus;

Fig. 2 is a wiring diagram, and

Fig. 3 is a sectional view through the housing of the remote unit.

Referring to the drawings, the reference numeral 10 designates the glass electrode which is supported from a housing 11 by means of a clamp 12. This electrode is adapted to be immersed in a sample of liquid contained within a sample cup 13 which may be supported below the glass electrode 10 by means of a movable shelf 14. The housing 11 is connected by means of a cable 15, which includes eight conductors, to the main unit 16. This main unit may suitably comprise an instrument board 17 upon which is mounted a suitable receptacle 18 for the reception of prongs 19 of a plug 20 secured to the end of the cable 15. Thus, the remote unit and the central or control unit may be readily separated and connected again.

The cable 15 may be of any desired length. Thus, I have operated satisfactorily with cables as long as 50 feet and there is no apparent reason why the cable should not be of any length which may be necessary.

The panel 17 carries a double pole, double throw switch 21 which has a central off position, a standardizing position to the left, and a reading or operating position to the right. The panel 17 also carries a galvanometer 22 which is connected to the poles of the switch 21. When the switch 21 is thrown to the left, the galvanometer is connected to conductors 23 and 24 and when it is thrown to the right, the galvanometer is connected to the conductors 25 and 26.

The conductor 24 includes a standard cell 27 and is connected to one end of a resistance 28 and to one end of a potentiometer 29. The conductor 23 is connected to one side of a cell 30, the other terminal of which is connected to a movable contact 31 which engages the resistance 28. The contact 31 is controlled by the button 32 mounted on the panel 17. The potentiometer 29 is adjustably engaged by a contact 33 which is actuated by a button 34 mounted on the panel 17. This button carries on the inner side of the panel 17 a scale 35 which is visible through a window 36 in the panel 17. The scale 35 is graduated so as to indicate the pH value of the liquid under test by direct reading.

The contact 33 is connected to a conductor 37 which extends through the cable 15. The conductor 37 may suitably be grounded. The end of the potentiometer 29 remote from the conductor 24 is connected to a conductor 38 which is connected through a variable resistance 39 to the conductor 23. The conductor 38 is connected to a contact 40 which cooperates with a potentiometer 41. The potentiometer 41 is connected to a cell 42. One end of the potentiometer 41 is connected to a contact 43 and to a conductor 44 which extends through the cable 15.

The contact 40 is connected to a button 45 mounted on the panel 17. The contact 43 cooperates with a potentiometer 46 which is connected to a cell 47. The contact 43 is controlled by a button 48 mounted on the panel 17. One end of the potentiometer 46 is connected to a cell 49 which is the "C" battery for the thermionic tube 50 which is part of the remote unit. The other side of the cell 49 is connected to a conductor 51 which extends through the cable 15.

A battery 52, which is the "B" battery for the thermionic tube 50, is located between the conductors 25 and 51. The conductor 26 is connected to a contact 53 which is operated by a button 54 on the panel 17. The contact 53 cooperates with a potentiometer 55 which is connected to a suitable cell 56. One end of the potentiometer 55 is connected to a conductor 57 which extends through the cable 15.

A high resistor 58 is located between the conductor 25 and the conductor 57. Also mounted on the panel 17 is a double pole, single throw switch 59 which controls the poles 60 and 61. When the switch 59 is thrown in one way, the switches are both opened and when it is thrown the other way, both the switches are closed. A conductor 62 which extends through the cable is adapted to be connected through the pole 60 to a battery 63. The other pole of the battery 63 is connected to a conductor 64 which extends through the cable. Another conductor 65 which extends through the cable is adapted to be connected by the poles 61 to a conductor 66. The conductor 66 includes a switch 67 which is normally closed and can be opened by pressing a button 68 mounted on the panel 17. The conductor 66 is connected to a battery 69 in series with the switch 67. The battery 69 is also connected to a conductor 70 which extends through the cable 15.

The remote unit will now be described in detail. This unit comprises the housing 11 which is shown in section in Fig. 3. This housing may include a vertical strip 71 of Bakelite or the like, upon which is mounted a relay 72 and a base 73 for the thermionic tube 50 which may suitably be a Z–4 or 37 type tube. Any type of tube suitable for electrometer applications may be used. I find that it is advantageous to maintain all of the elements of the tube at constant temperature as far as possible, and for this purpose I prefer to enclose the tube within a jacket 74 of felt or other good insulating material. An upper end 75, which may also be of Bakelite or other suitable insulating material, is rigidly carried on the upper end of the strip 71 by means of a bracket 76. This bracket also provides an opening whereby the cable 15 may pass into the housing 11. At its lower end the strip 71 carries a bracket 77 which serves as a support for the glass electrode 10.

The housing comprises a cylindrical wall 78 which may suitably be of Bakelite and also a lower end member 79 through which the bracket 77 passes. The end members 75 and 79 are cemented to the cylindrical wall 78 so as to protect the elements inside the housing from humidity. Through the closure member 79 passes a conductor 80 which leads downwardly into the glass electrode 10. The upper closure member 75 carries a terminal 81 to which the conductor 82 is connected. This conductor also connects to a reference half-cell 83 which may suitably be of the KCl HgCl$_2$–Hg type.

This half-cell comprises a chamber 84 which contains successive layers of metallic mercury, mercuric chloride and saturated solution of potassium chloride. The potassium chloride solution communicates through a bent tube 85 and rubber tube 86 with the lower portion of the sample cup 13. The tube 85 is provided with a stop cock 87 and the tube 86 is provided with a snap clamp 88. In the normal operation of the device the cock 87 is closed and the clamp 88 is in tube-closing position. It will be understood, however, that conductivity is maintained between the liquid in the sample cup and in the chamber 84 through these valves at all times.

The glass electrode 10 may suitably be of the common bulb type and may comprise a platinum wire which is connected to the conductor 80 and extends into the liquid within the electrode which may suitably consist of deci-normal hydrochloric acid to which a small amount of quinhydrone has been added. The conductors 65 and 70 of the cable 15 are connected to the winding 89 of the relay 72. The armature 90 of this relay is connected to the conductor 80 and a spring 91 normally biases the armature away from a contact point 92 which is connected to conductor 44. It will thus be understood that when the relay 72 is energized the conductor 80 which is connected to the interior of the glass electrode 10 and to the grid of the tube 50, is connected by the conductor 44 to the contact 43 and to one end of the potentiometer 41.

Conductors 62 and 64 are connected to the heating filament of the tube 50. The conductor 57 is connected to the plate of the tube 50. The conductor 51 is connected to the cathode of the tube 50, and the conductor 37 is connected to the terminal 81 and, consequently, to the electrode 83. I prefer to connect the conductor 37 through a suitable condenser 93, which may have a capacity of 0.001 microfarad, to the conductor 80.

The measurement of pH depends upon the fact that within certain limits, that is, approximately between 0 and 9 degrees pH, the cell constituted by the electrodes 10 and 83 gives a voltage which is proportional to the pH of the liquid contained in the vessel 13. This voltage impressed upon the grid of the tube 50 gives a plate current which is proportional thereto. Consequently, if the voltage provided by the battery including the electrodes 10 and 83 is not impressed upon the grid of the tube 50 and the output of this tube is balanced by suitable manipulation of potentiometers, so that the galvanometer 22 reads zero, and then the effect of the electrode is applied to the grid, the galvanometer 22 will be deflected. To correct this deflection the potentiometer 29 has to be adjusted. The degree of adjustment, as shown by the dial 35, will indicate the hydrogen ion concentration numerically and directly.

The operation will now be described in detail. The switch 59 is closed, with the result that the relay 72 is energized and conductor 80 is connected to the conductor 44. Consequently, the grid circuit includes the cathode, the conductor 51, the "C" battery 49, potentiometer 46, contact 43, conductor 44, contact 92, armature 90 and conductor 80 to grid. The switch 21 is first closed to the left and the contact 31 is operated by the button 32 until the galvanometer 22 is returned to zero. In other words, the cell 30 is balanced against the standard cell 27 by varying the resistance 28.

It may here be remarked that the potentiometer 29, of which the contact 33 is moved by the button 34 which has rigidly secured to it the scale 35, must be adjusted so as to correlate the voltage change with variation of pH. Thus, I find that with an apparatus of the type described each degree change in pH may give, for example, a voltage change of 59 millivolts and the potentiometer 29 should be arranged to have a potential drop of approximately 59 millivolts for each pH space unit on the dial 35. The adjustment of millivolts to displacement on the potentiometer 29 may be regulated by the variable resistance 39, which resistance is then set.

The galvanometer switch is then turned to the right to operating or reading position. The points 43 and 53 are adjusted by their appropriate buttons so as to bring the galvanometer to zero. This adjustment should bring the contact 43 to approximately the center of the potentiometer 46. It will thus be seen that the voltage applied to the grid is the algabraic sum of the voltage of cell 49 and the effective portion of the potentiometer 46. This voltage produces a certain plate current across the high resistance 58. The drop of potential across the resistance 58 is counter-balanced by the potential of the effective part of the potentiometer 55 so that no current passes through the galvanometer. This standardization, that is, the bringing of the galvanometer to zero reading by manipulation of button 45, is effected before each reading, if necessary.

A standard test solution, say one with a pH of 7, is placed in the test cup 13 so that the glass electrode 10 is submerged in the liquid. The dial 35 is then set to read 7, which causes a corresponding movement of the contact 33 on the potentiometer 29. The switch 67 is then depressed by the button 68 and the relay 72 is no longer energized, so that the armature 90 is moved away from the contact 92 by the spring 91. Under these circumstances the grid bias is the algebraic sum of the voltages of the battery 83—10, the voltage of the effective portion of the potentiometer 29, the voltage of the effective portion of the potentiometer 41, the voltage of the effective portion of the potentiometer 46, and the voltage of the "C" battery 49.

In general, this is a different grid bias than was previously impressed on the tube and, consequently, the plate current is different and the voltage across the resistance 58 is different. The button 45 is now actuated in the appropriate direction to return again the galvanometer reading to zero. The procedure may be repeated with an unknown solution. In general, it will cause deflection of the galvanometer and if the button 34 is turned in the appropriate direction to bring the galvanometer needle to zero position, the pH value of the test solution will be shown on the dial 35.

It is very important that the conductor 80, which connects the glass electrode 10 to the grid of the thermionic tube 50, should be very short to avoid picking up of stray electrical impulses which would give erratic readings. For this reason I locate the tube 50 in the same unit as the glass electrode 10. The variation due to the introduction of the pH battery into the grid circuit affects the plate current which is a direct current and may pass through the cable 15 for any desired length without the introduction of error. Electrical control of the remote unit is effected exclusively at the main unit and no control is exercised at the remote unit with the exception of placing the appropriate sample in the cup 13.

This application is a continuation in part of my copending application Serial No. 133,333, filed March 27, 1937.

Although the invention has been disclosed in connection with the specific details of a preferred embodiment thereof, it must be understood that such details are not intended to be limitative of the invention except insofar as set forth in the accompanying claims.

Having thus described my invention, what I claim as new and desire to secure by Letters Patent of the United States is:

1. In combination, a compact test unit comprising a glass electrode, a thermionic tube in close proximity thereto, a short conductor connecting the glass electrode to the grid of the tube, indicating means in remote relation to said test unit, a cable adapted to connect the plate of the tube to said remote indicating means, means adjacent said tube operable for rendering said tube effective and ineffective, and control means adjacent said indicating means for actuating said operable means.

2. In combination, a compact test unit comprising a glass electrode, a thermionic tube in close proximity thereto, a short conductor connecting the glass electrode to the grid of the tube, a relay adjacent said tube, a conductor adapted to be connected to said grid by said relay, conductors for controlling said relay, conductors connected to said tube, indicating means in remote relation to said test unit, a cable through which pass all said conductors except the first said short conductor for connecting the unit to said remote indicating means, and means adjacent said indicating means for energizing and deenergizing said relay.

3. In an apparatus for measuring hydrogen ion concentration, in combination, a test unit comprising a glass electrode, a thermionic tube in close proximity thereto, a short conductor connecting said electrode to the grid of the tube, and a relay, an independent unit including a potentiometer and means for actuating said relay, and a cable connecting said units including a circuit adapted to connect said potentiometer to the cathode of the tube and to said electrode, said relay being adapted to eliminate the glass electrode and the potentiometer from the circuit.

4. In an apparatus for measuring hydrogen ion concentration, in combination, a glass electrode, a thermionic tube in close proximity thereto, a short conductor connecting said electrode to the grid of the tube, a circuit including in series, a measuring potentiometer and a standardizing potentiometer connecting said electrode to the cathode of the tube, said potentiometers being located in remote relation to said thermionic tube, and a relay located adjacent said potentiometers for eliminating the glass electrode and measuring potentiometer from said circuit.

5. In an apparatus for measuring hydrogen ion concentration, in combination, a remote unit comprising a glass electrode, a thermionic tube in close proximity thereto, a short conductor connecting said electrode to the grid of the tube, a control unit comprising electrical devices for indicating electric effects and a variable potentiometer, and a cable connecting said units including conductors establishing a circuit extending between said units including said electrode and said potentiometer and connecting to the cathode of the tube, a relay in the remote unit, and means in the control unit for controlling the relay, said relay being adapted to eliminate the glass electrode and potentiometer from said circuit.

6. In an apparatus for measuring hydrogen ion concentration, in combination, a remote unit comprising a glass electrode, a thermionic tube in close proximity thereto, a short conductor connecting said electrode to the grid of the tube, a control unit comprising electrical devices for indicating electric effects, a measuring potentiometer and a standardizing potentiometer, and a cable extending between said units including conductors establishing a circuit including said electrode and said potentiometers and connecting to the cathode of the tube, a relay in the remote unit, and means in the control unit for controlling the relay, said relay being adapted to eliminate the glass electrode and measuring potentiometer from said circuit.

7. In an apparatus for measuring hydrogen ion concentration, in combination, a glass electrode, a thermionic tube, a liquid-tight housing enclosing said tube, a short conductor extending through said housing and connecting the glass electrode to the grid of the tube a further conductor, and circuit-changing means within said housing, said circuit-changing means being adapted to connect said short conductor to said further conductor, and means remote from the glass electrode for actuating the circuit-changing means.

8. In an apparatus for measuring hydrogen ion concentration, in combination, a glass electrode, a test vessel adapted to support liquid around said electrode, a reference half cell adapted to cooperate with the liquid in said vessel, a housing in close propinquity to said glass electrode, a thermionic tube in said housing, heat insulating material in said housing enclosing said tube, a short conductor passing through said housing connecting the electrode to the grid of the tube, a condenser located between the reference half cell and said conductor, and conductors extending into said housing and connected to elements of the tube.

9. In an apparatus for measuring hydrogen ion concentration, in combination, a glass electrode, a test vessel adapted to support liquid around said electrode, a reference half cell adapted to cooperate with the liquid in said vessel, a housing in close propinquity to said glass electrode, a thermionic tube in said housing, heat insulating material in said housing enclosing said tube, a short conductor passing through said housing connecting the electrode to the grid of the tube, a condenser located between the reference half cell and said conductor, and a single cable including conductors connected to the cathode heater and plate of said tube.

10. In an apparatus for measuring hydrogen ion concentration, in combination, a glass electrode, a thermionic tube, a liquid-tight housing enclosing said tube, a short conductor extending through said housing and connecting the glass electrode to the grid of the tube, a relay within the housing, a conductor extending into the housing adapted to be connected to the grid by said relay, and conductors extending into the housing to energize the relay.

11. In an apparatus for measuring hydrogen ion concentration, in combination, a glass electrode, a test vessel adapted to support liquid around said electrode, a reference half cell adapted to cooperate with the liquid in said vessel, a housing in close propinquity to said glass electrode, a thermionic tube in said housing, heat insulating material in said housing enclosing said tube, a short conductor passing through said housing connecting the electrode to the grid of the tube, a condenser located between the reference half cell and said conductor, a relay in said housing, a conductor extending into said housing and adapted to be connected to said grid by said relay, and other conductors extending into said housing and connected to elements of the tube and to said relay.

12. In an apparatus for measuring hydrogen ion concentration, in combination, a glass electrode, a thermionic tube adjacent thereto, a short conductor connecting the glass electrode to the grid of the tube, a further conductor, a circuit-changing means adjacent said tube and glass electrode, said circuit-changing means being adapted to connect said short conductor to said further conductor, and means remote from the glass electrode for actuating the current-changing means.

13. In an apparatus for measuring hydrogen ion concentration, in combination, a glass electrode, a thermionic tube adjacent thereto, a short conductor connecting the glass electrode to the grid of the tube, a relay adjacent said tube and glass electrode, a conductor adapted to be connected to the grid of the tube by said relay, and conductors connected to said relay to energize the same.

14. Apparatus for measuring hydrogen ion concentration comprising a test unit, a control unit in remote relation thereto, and a cable connecting said units, said test unit including a glass electrode, a reference half cell adapted with the liquid to be tested to constitute a cell, a thermionic tube, a short conductor connecting said glass electrode to the thermionic tube so as to control the plate current of said tube, said control unit including a plurality of variable voltage supplying means, calibrated means for controlling one of said variable voltage supplying means, a galvanometer, means tending to supply opposite current to the galvanometer, said cable comprising conductors connecting said cell and said plurality of variable voltage supplying means in circuit, a conductor for short-circuiting last said variable voltage supplying means and said cell in last said circuit, and conductors for supplying the plate current to said galvanometer.

15. In an apparatus for measuring hydrogen ion concentration, in combination, a test unit, a control unit in remote relation thereto, and a cable connecting said units, said test unit including a glass electrode, a reference half cell adapted to cooperate with the liquid being tested to provide a voltage producing cell, and a thermionic tube adjacent said glass electrode, said control unit including means for supplying a plurality of voltages, a resistance and a galvanometer, said cable including a conductor adapted to connect the plate of said tube to said galvanometer, said resistance and to one of said means for supplying voltage, and conductors completing a circuit including the grid and plate of said tube, said cell and a plurality of said voltage supplying means, and a conductor for short-circuiting said cell and one of said voltage supplying means out of last said circuit.

DONALD H. CAMERON.